United States Patent
Kaal et al.

(10) Patent No.: US 9,429,210 B2
(45) Date of Patent: Aug. 30, 2016

(54) DEVICE FOR TRANSMITTING OR DECOUPLING MECHANICAL VIBRATIONS

(75) Inventors: William Kaal, Darmstadt (DE); Tobias Melz, Darmstadt (DE); Björn Seipel, Florstadt (DE); Roman Kraus, Karben (DE); Jan Hansmann, Darmstadt (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 95 days.

(21) Appl. No.: 14/008,780

(22) PCT Filed: Dec. 30, 2011

(86) PCT No.: PCT/EP2011/006616
§ 371 (c)(1),
(2), (4) Date: Sep. 30, 2013

(87) PCT Pub. No.: WO2012/130268
PCT Pub. Date: Oct. 4, 2012

(65) Prior Publication Data
US 2014/0014808 A1 Jan. 16, 2014

(30) Foreign Application Priority Data
Apr. 1, 2011 (DE) .......................... 10 2011 015 798

(51) Int. Cl.
*F16M 13/00* (2006.01)
*F16F 15/04* (2006.01)
(Continued)

(52) U.S. Cl.
CPC ................. *F16F 15/04* (2013.01); *F16F 1/32* (2013.01); *F16F 15/021* (2013.01); *F16F 15/073* (2013.01)

(58) Field of Classification Search
USPC ......... 188/378, 379, 380; 248/560, 566, 581
See application file for complete search history.

(56) References Cited

U.S. PATENT DOCUMENTS 2,922,669 A 1/1960 Hansen
2,924,419 A * 2/1960 Wells ....................... 267/140.11
(Continued)

FOREIGN PATENT DOCUMENTS

DE 879 774 6/1953
DE 1 262 095 2/1968
(Continued)

OTHER PUBLICATIONS

Bonello, Philip, et al.: "Vibration Control Using an Adaptive Tuned Vibration Absorber with a Variable Curvature Stiffnes Element", in: Smart Materials and Structures 14 (5), pp. 1055-1065, (2005).

*Primary Examiner* — Bradley Duckworth
(74) *Attorney, Agent, or Firm* — Fitch, Even, Tabin & Flannery LLP

(57) ABSTRACT

A device for transmitting or decoupling mechanical vibrations between a first component and a second component with at least one of the first and the second components being free to vibrate in the at least one direction including: a planar coupling element, coupling the first and second components together, having a planar top surface and a planar bottom surface, and having a variably adjustable stiffness extending in the at least one direction; the planar coupling element, having planar dimensions with the planar coupling element being dimensionally stable along the planar dimensions and being elastic in a direction perpendicular to the planar surfaces; the first and second components are rotatable relative to each other about an axis extending in the direction perpendicular to the planar surfaces and in which at least one of the components is free to vibrate for adjusting the stiffness.

36 Claims, 7 Drawing Sheets

(51) Int. Cl.
    *F16F 1/32*     (2006.01)
    *F16F 15/02*    (2006.01)
    *F16F 15/073*   (2006.01)

(56) References Cited

U.S. PATENT DOCUMENTS

| | | | |
|---|---|---|---|
| 3,075,619 A * | 1/1963 | McCandliss | 188/379 |
| 3,462,136 A * | 8/1969 | Rumsey | 267/136 |
| 4,218,036 A * | 8/1980 | Pitkanen | 248/478 |
| 4,840,083 A | 6/1989 | Hagan et al. | |
| 5,445,249 A * | 8/1995 | Aida et al. | 188/378 |
| 5,779,010 A * | 7/1998 | Nelson | 188/378 |
| 5,884,735 A * | 3/1999 | Eckel et al. | 188/378 |
| 6,009,986 A | 1/2000 | Bansemir et al. | |
| 6,358,153 B1 * | 3/2002 | Carlson et al. | 464/68.3 |
| 6,378,672 B1 * | 4/2002 | Wakui | 188/378 |
| 6,547,053 B2 * | 4/2003 | Shih | 192/55.61 |
| 6,675,793 B1 * | 1/2004 | Saunders | 124/89 |
| 6,708,962 B2 * | 3/2004 | Allaei | 267/136 |
| 7,464,800 B2 * | 12/2008 | Nerubenko | 188/379 |
| 7,487,958 B2 * | 2/2009 | Wang | 267/136 |
| 7,770,391 B2 * | 8/2010 | Melz et al. | 60/527 |
| 7,971,692 B2 * | 7/2011 | Gebelin | 188/378 |
| 8,282,087 B2 | 10/2012 | Mayer et al. | |
| 8,561,499 B1 * | 10/2013 | Schiemann et al. | 74/574.1 |
| 8,910,762 B2 * | 12/2014 | Takikawa et al. | 188/378 |
| 2005/0184601 A1 | 8/2005 | Kweon et al. | |
| 2007/0125930 A1 | 6/2007 | Tsai | |
| 2008/0185248 A1 * | 8/2008 | Zeid et al. | 188/379 |
| 2010/0101906 A1 | 4/2010 | Herold et al. | |
| 2014/0353102 A1 * | 12/2014 | Zeidan | 188/380 |

FOREIGN PATENT DOCUMENTS

| | | |
|---|---|---|
| DE | 196 41 763 C2 | 4/1998 |
| DE | 101 64 368 A1 | 6/2003 |
| DE | 10 2005 043 429 A1 | 11/2006 |
| WO | WO 2008/131740 A1 | 11/2008 |

* cited by examiner

DEVICE FOR TRANSMITTING OR DECOUPLING MECHANICAL VIBRATIONS

CROSS REFERENCE TO RELATED APPLICATION

Reference is made to German Application Serial No. DE 10 2011 015 798.0, filed on Apr. 1, 2011, which application is incorporated herein by reference in its entirety.

BACKGROUND OF THE INVENTION

1. Field of the Invention

The invention relates to a device for transmitting or decoupling mechanical vibrations, comprising a first component and a second component, which are connected to each other by a coupling element having a variably adjustable stiffness in at least one direction of action, and along which at least one component is supported in a vibrating manner.

2. Description of the Prior Art

If two components are connected to one another via a mechanical coupling element, for example via a spring which can be deflected bidirectionally in a spatial direction, then in the event of a vibrational excitation of a component, a vibration transmission to the other component results from the coupling element. The vibration transmission between both components can be influenced by adjusting the stiffness of the coupling element. In the case of a low stiffness of the coupling element, the vibration transmission can be reduced.

If it is necessary for example to support a machine arrangement on a machine foundation with as little vibration as possible, then a coupling element is used which has a fixed predetermined stiffness or is inherent elasticity. However, if the machine assumes different vibration states as a function of the operating state, it may occur that the machine is operated at the natural frequency of the system composed of the coupling element and the machine. Pronounced vibration amplitudes occur in this resonant operating state, which may lead to increased noise and also increased mechanical loading of the system as a whole. Usually, machine operation and the stiffness of the coupling elements are adapted to one and another to prevent resonance or to pass through resonance in a short period when starting up the machine.

The indicated possibility for influencing the vibration transmission between two components by a coupling element can also be used, in addition to the above-mentioned low-vibration supporting of two components relative to one another, for eliminating the targeted vibration or reducing a vibrating component.

In this case, in the manner known per se, a so-called vibration absorber is connected to the vibrating component. To this end, a mass, called an absorber mass, is connected via a coupling element to the vibrating component. The resonant frequency or tuning frequency or absorbing frequency of the vibration absorber can be set by the absorber mass and also by the stiffness of the coupling element. As a result the vibrations of the component to be vibration damped are compensated in a narrow frequency band around the tuning frequency of the vibration absorber. In the case of alternating vibration states within the component to be vibration damped, it is furthermore advantageous to adapt the tuning frequency of the vibration absorber to the instantaneous excitation frequency, in order in this manner to variably construct the effective range of operation of the vibration absorber.

A range of differently constructed coupling elements is known for both of the previously mentioned use cases for a targeted influencing of the vibration transmission between two components. By using coupling elements it is possible to variably adapt a vibration reduction or complete vibration decoupling between two components in spite of changing vibration states by influencing the stiffness or elasticity.

As an example for a device with a low-vibration support of a component coupled to a foundation with a variably adjustable spring stiffness between component and foundation, a support unit is suggested by an article by Bonello, Philip et al, "Vibration Control Using an Adaptive Tuned Vibration Absorber with a Variable Curvature Stiffness Element", in: Smart Materials and Structures 14 (5), pp. 1055-1065, (2005), which clamps two separately arcuately constructed spring elements between an upper bearing and lower support surface with a changeable stiffness produced by changing the pre-bending of the respective spring elements with the aid of an adjustment unit.

A device for vibration decoupling is described in DE 10 2005 043 429 A1, which has a completely peripherally damped planar membrane within a housing structure, on which a rod-shaped load-bearing having a longitudinally extending rod which extends orthogonally from the planar membrane, which is connected to a vibrating component. In order to influence the planar elasticity of the membrane, at least one actuator having a converter material is applied to the same which has the capacity to influence the deformability of the planar membrane.

Approaches using variably tuneable stiffness characteristics are also known for realizing vibration absorbers. One known embodiment for a vibration absorber has a centrally supported spring beam central support attached to a component which is to be vibration damped. An absorbing mass is attached to mutually opposite exposed spring beam ends. The absorbing masses vibrate with maximum amplitudes relative to the central support when the absorbing frequency is reached. To influence the absorbing frequency, piezoelectric actuators are applied on both sides of the central support along the spring beam, which influence planar elasticity of the spring beam. An alternative option for influencing the absorbing frequency of a previously described structure for a vibration absorber is disclosed by WO 2008/131740 A1. In this case, the spacing of the absorber masses supported on both sides along the spring beam relative to the central support is changed via a mechanical actuator. As a result, the change in exposed beam lengths the absorbing frequency changes.

SUMMARY OF THE INVENTION

The invention is a device for transmitting or decoupling mechanical vibrations, comprising a first component and a second component, which are connected by a coupling having a variably adjustable stiffness in at least one direction of action in which at least one component is supported in a vibrating manner. As a result, the use of the device both as a support element and as a vibration absorber is possible without having to undertake conceptual modifications. The device is constructed robustly and is made compactly as possible, so that use is possible in areas which are difficult to access. In particular, an option is created, with an adjustment range which is as large as possible regarding the stiffness of the coupling element while the adjustment process is as brief as possible in an abrupt stiffness increase and also an abrupt stiffness reduction is achieved.

The device according to the invention furthermore may be in a modular form in accordance with modular design principles.

A generic device for transmitting or decoupling mechanical vibrations is constructed in accordance with the invention with the coupling element being a planar element with a planar top side and bottom side and also along planar dimensions is dimensionally stable in and is elastically deformable in a dimension orthogonal to the planar dimensions. In a preferred embodiment, the planar element is constructed as a disc and is used with two ring surfaces acting as bearing surfaces for the components which come into active connection with one another via the planar element. Here, both components in each case have n≥2, preferably ≥3 contacting agents, via which the first and also the second components come into contact with the planar bottom side and/or planar top side. Both components are preferably arranged opposite to the coupling element which is constructed as a planar element. Both components are additionally arranged to be rotatable relative to each other about a spatial axis oriented orthogonally to the planar element dimensions with the spatial axis coinciding with the at least one direction of action in which at least one component is supported in a vibrating manner.

By rotating at least one component relatively to the second, the bearing regions, at which the contacting agents of both components come into contact with the planar element, are changed as a result of which a change in planar elasticity acting in the axial direction of action changes which is along the spatial axis.

If, for example, the contact of both components overlap or overlap substantially along the axis of rotation of, then the effective planar stiffness of the planar element with respect to the two components coming into active connection via the coupling element is its maximum. In this case, the contacting agents of both components are at least substantially directly axially opposite while only being separated by the thickness dimension of the planar element, so that the planar element cannot make a planar elastic contribution to the mechanical coupling of both components.

If the bearing points of the contacting agents of both components result from relative rotation around the spatial axis to a spatial distribution around the spatial axis with maximum mutual spacing angles in each case, then the axially effective planar stiffness is reduced to a minimum.

Only a rotation of at least one component relative to the other is therefore required to vary the axially effective planar stiffness of the planar element. The rotation can be initiated either manually or in a manner provided by an actuator. The rotation process can be realized slowly or abruptly, that is without a technically relevant time delay, for example with a suitably selected electric motor. Of course, alternative drive technologies are conceivable, for example by adjustment actuators using converter materials, such as, for example a piezoelectric travelling wave motor, inchworm motor, or shape memory alloys, to mention just a few possibilities.

In a particularly advantageous manner, the device according to the invention can be a compact design, in that for example, the components coming into active connection by the coupling agent are constructed in the form of can bottom and can lid, which comprises an internal space in which the coupling element constructed as planar element is introduced. Also, the internal space offers sufficient space to accommodate at least one drive actuator for rotating both components relatively to one another. Particularly advantageous is a constructional change, which does not become outwardly visible, when both components are rotated relative to one another. This results in the case of suitable shaping of the space of the two components, as is described below. By one of the possible spatially compact and robust configuration and the desired scalability of the device, the device of the invention is suitable for any conceivable installation location which is independent of the spatial conditions or of mechanical, thermal, chemical or other environmental conditions in situ.

When the invention is used as a vibration-decoupling support between two bodies, both components, which are preferably constructed in the form of can-like housing halves, include a contact surface facing away from the inner space and directed outwards. Both components can be brought into connection with the bodies to be decoupled from vibration in each case. In the simplest case, the component constructed as a housing bottom touches the surface of a stable foundation, whereas the vibrating body is supported on the lid top side of the upper component.

When used as a vibration absorber, the device of the invention is connected by its component which is preferably constructed in the form of a can bottom to the body/system to be vibration damped while the component constructed as a can lid is an absorber mass or connected to an absorber mass.

The connection or joining of both components to a planar element of the respective coupling agents thereof can be executed in a variety of ways.

In a simplest embodiment, the first component is oriented vertically to the gravitation vector below the second component, so that the coupling element which is constructed as a planar element, bears loosely against the contacting agents of the first component. The coupling agents are preferably constructed as bars or strips and come into contact with the planar bottom side of the planar element along a line or strip of contact. The preferably annularly constructed planar element has a central opening, through which a central spatial axis passes. Relative to this spatial axis, the bar or strip contacting agents are in each case connected in a spatially fixed manner with a radial orientation in each case and also with evenly distributed angular spacings around the spatial axis to the first coupling element. Fundamentally, with respect to the construction of the planar element, the planar element can also be constructed without an opening, for example as a membrane-like manner, but a planar element with central opening or at least with a central material softening can be deformed in a predetermined manner orthogonally to the planar longitudinal direction. Thus, in the following, an annularly constructed planar element is assumed.

The contacting agents of the top first and the bottom second component, which are likewise constructed in a rod or strip, bear loosely against the planar element top side of the annularly constructed planar element. In the same way as in the case of the first component, the contacting agents of the second component are connected to the second component in a spatially fixed manner. The number of contacting agents per component is the same in each case.

In a simple preferred exemplary embodiment, for example n=3 coupling agents constructed as a rod or strip are provided per component, which are evenly distributed around the spatial axis. That is, the contacting agents for each component enclose a mutual spacing angle $\alpha$, where $\alpha=360°/(n=3)$, of 120°. If n contacting agents per component are chosen, then they same have a spacing angle $\alpha$ of $\alpha=360°$.

In the preceding case, the respective 3 contacting agents per component are located and the position of maximum stiffness in each case in pairs in an axial projection overlapping onto the annular coupling element or in each case enclose only a very small angle β in pairs in each case. If the first top and second bottom component are rotated relatively, with the first component being in a position of maximum planar elasticity or lowest axial planar stiffness, then the contacting regions of all six contacting agents are distributed around the spatial axis with a maximum mutual angular spacing β, where β=360/(2n) and n=3, i.e. β=60°. As the contacting agents bear loosely on the planar top and planar bottom side of the annular coupling element, rotating both components relative to each other is readily possible. Due to the loose joining of the contacting agents, only compressive forces can be transmitted onto the annular coupling element for each component.

Of course, configurations for the contacts constructed as a pin or a strip are possible, in which the contacting agents act to exert a biaxial clamping force onto the planar top and bottom sides of the planar element. A clamping force of this type can be set via corresponding clamping and fixing devices in a variable manner, down to a releasable fixing. In this manner, it is possible to exert biaxially directed forces onto the planar element for each component. One possible embodiment provides a clasp encompassing the annular coupling element for each contacting agent. To illustrate a clamping mechanism of this type, reference may be made to an exemplary embodiment which is described further in connection with the drawings.

The coupling agent constructed as planar element is preferably constructed as a disc or in a circular manner. Of course annular shapes differing from the disc shape can also be chosen. Typically, discs have a rectangular cross section with a planar top side and bottom side. The coupling element can also be a wire shaped to form a ring with a circular wire cross section. Thus, the wire shape also has a planar top side and bottom side, which, even though it is much smaller than the circular shape, can nonetheless be measured, with the contacting agents of the two components in an active connection.

It is not necessarily required that the coupling element have a round external contour with angular peripheral edges or peripheral edges of the planar element shaped in any desired manner also being possible. The planar element is however provided with a centrally arranged opening, for providing a desired planar elasticity.

The flat material, from which the planar element is typically produced, is to be chosen individually for the device and the acting supporting forces. Metallic materials, such for example flat steel, are particularly suitable. Composite materials which are made from layers may also be suitable. For the case of an active influence on a planar stiffness determined by the planar element, an actuator constructed from a converter material, such as for example a piezoelectric ceramic, and also a sensor if necessary on at least one surface region of the planar element or to integrate the sensor into the planar element.

In a further embodiment, the planar element is made from parts, for example starting from an annular or disc-shaped planar element, divided by radial cross cuts into two, three or more ring or disc sectors, being end-face separation planes positioned loosely opposite one another, so that the individual ring or disc sectors form a complete annular or disc-shaped planar element. One component in each case, for example the first component, is in each case connected securely to all annular or disc-shaped sectors, such that the separate annular or disc-shaped sectors are in each case are securely joined to the first component at a contact point located dose to a separation plane via the contacting agents. In contrast, the second component is in sliding contact by its contacting agents along the ring or disc sectors which are unilaterally securely connected to the first component. An embodiment of this type has a much larger range of achievable planar elasticity than of planar elements constructed in one piece. Further explanations are furthermore realizable with reference to the relevant illustration.

Particularly advantageous embodiments of the device according to the invention are described below with reference to the exemplary embodiments.

BRIEF DESCRIPTION OF THE DRAWINGS

The invention is described by way of example in the following embodiments without limitation to the drawings. In the figures.

DETAILED DESCRIPTION OF THE INVENTION

Figure 1:
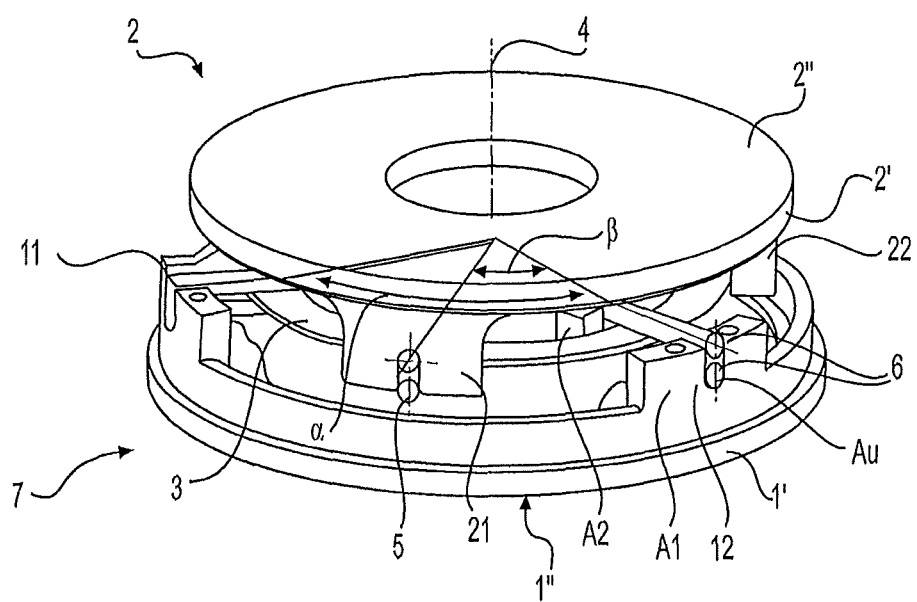
FIG. 1 shows an overall perspective illustration of an exemplary embodiment according to the invention for transmitting or decoupling mechanical vibrations.

In a perspective illustration, FIG. 1 shows a device for transmitting or decoupling mechanical vibrations, comprising a first component 1 and a second component 2, which are connected to each other by a planar coupling element 3 having a variably adjustable stiffness in at least one direction of action, which in the exemplary embodiment is shown along the axis 4.

In the exemplary embodiment, the first and second components 1 and 2 have circular housing plates 1' and 2'. The respective outwardly oriented sides of the plates are a contact surface 1" and 2", via which the bottom component 1 can be securely joined to a solid foundation (not illustrated) and the top component 2 can be securely joined to a body (not illustrated) supported in a vibrating manner at least in the direction along the axis 4. In this configuration, the device according to the invention is suitable as a vibration damping bearing.

On mutually facing sides of the housing plates 1' and 2', both components 1 and 2 have three accommodation structures 11 and 12 (13 not illustrated) and also 21 and 22 (23 not illustrated) arranged in an evenly distributed manner around the axis 4 each in the circumferential direction. Each of the individual accommodation structures has a radially outwardly and also radially inwardly attached accommodation shoulder A1 and A2 on the annular housing plate, in which a groove-shaped recess Au for accommodating two contacting agents 6 is introduced in each case. The contacting agents are constructed as bars and are supported radially in the direction of the axis 4 in the groove-shaped recesses Au of the radially inner and radially outer accommodation shoulders A1 and A2. Supported between the two fixed contacting agents 6 per accommodation structure 11, 12 and 13 and 21, 22 and 23 is the annularly constructed coupling element 3, which exclusively contacts the coupling agents of the components 1, 2 or is held by the same. Thus, in each case, three contacting agents 6 per component, which are in each case attached to be evenly distributed around the axis 4, enclose a mutual spacing angle α of 120°.

The contacting agents 6 which are constructed as pins, can come into active connection with the annularly constructed coupling element 3 in a different manner. For example, the contacting agents 6 connected to the first component 1 provide a secure and clamping force supported joint connection with the annularly constructed coupling element 3, whereas the contacting agents 5 connected to the second component 2 provide a loose, sliding joint connection with the annularly constructed coupling element 3. In this manner, it is possible to rotate the component 2 relative to the component 1 around the axis 4.

In a further design variant, all or just the coupling agents coupled to the one component can be releasably and securely brought into active connection with the annularly constructed coupling element 3.

Independently of the design configuration of the joint connection between the coupling elements 1 and 2 and the annularly constructed coupling element 3, relative rotatability of the component 1 with respect to the component 2 is ensured for a variable adjustment of the effective stiffness by the annularly constructed coupling element 3. On the other hand however, an unintentionally independent rotation of both components 1 and 2 relative to one another during the vibration-damping use is prevented. Both components 1 and 2 also execute relative vibration movements exclusively in the direction of action 4 orthogonally to the plane of the annularly constructed coupling element 3, on account of their mutual support provided by via the coupling element.

Figures 2A, 2B:
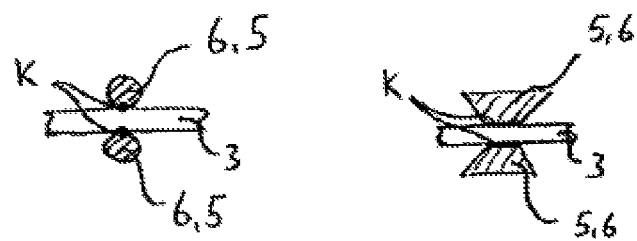
FIGS. 2a and b show cross sections of contacting agents bearing on the planar top or bottom side of the planar element.

FIG. 2a shows a cross section through two contacting agents 5 and 6 constructed as rods, which each have a round rod cross section and in each case have a linear contact K with the coupling element 3. In a different design variant according to FIG. 2b, the contacting agents 5 and 6 are provided with a trapezoidally constructed cross section, by which the contacting agents 5 and 6 come into contact with the coupling element 3 via a strip-shaped planar region K. Influence on the effective planar stiffness of the coupling element 3 is achieved by the respective construction of the contacting agents.

In the illustration according to FIG. 1, the first and second components 1 and 2 are rotated relative to one another in such a manner around the axis 4, so that the six contacting agents 5 and 6 enclose a mutual spacing angle β of 60°. In this position, the mutual spacing angle β is at maximum and the planar stiffness of the annular coupling element 3 acting axially to the spatial axis 4 is at minimum.

By means of the design configuration of the components 1 and 2 illustrated in FIG. 1, an inner space is enclosed in which the annularly constructed coupling element 3 is supported in a substantially mechanically protected manner with respect to external influences. Considering this embodiment, which has a spatial shape comparable to a closed can, the component 1 corresponds to a bottom and the component 2 corresponds to a top of a can. The space is not changed at all in the case of a change of the effective axial stiffness of the annular coupling element 3 in the case of rotation of both components 1 and 2. This design has the advantage of a versatile utilization and also positioning option even at inaccessible locations at which not much space is present.

Figure 3A:
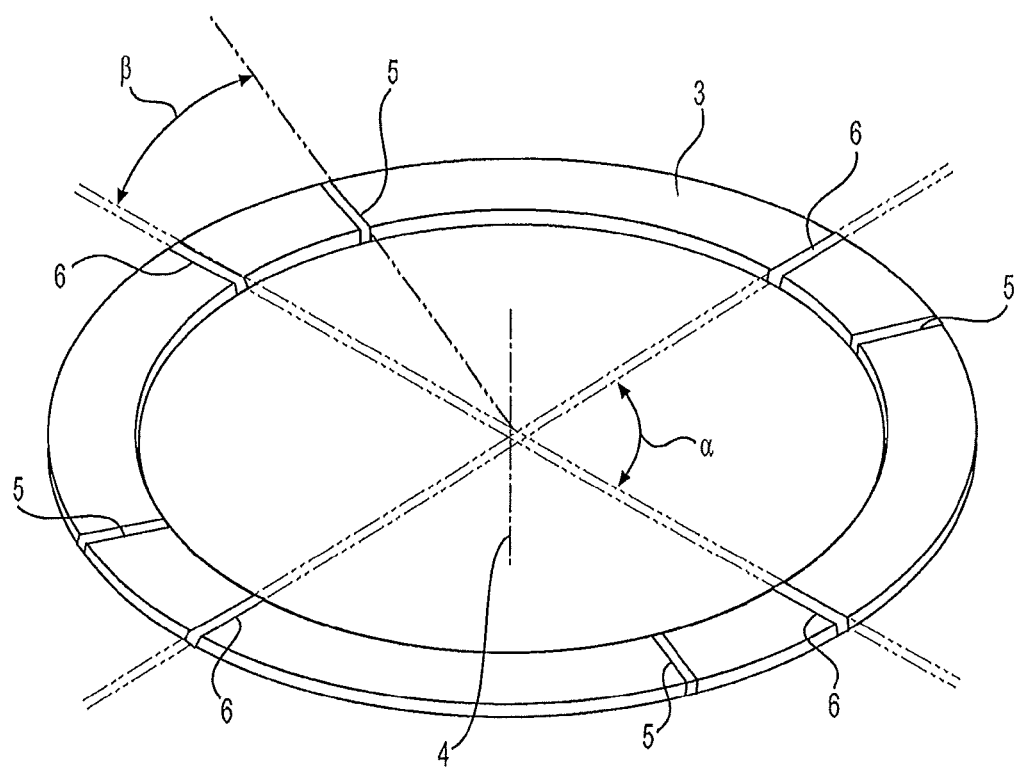
FIGS. 3a and b show an annularly constructed coupling element.

FIG. 3a shows an annularly constructed coupling element 3. Further, in the circumferential direction, those regions are marked, at which in each case four contacting agents 6 (not as in FIG. 1) of the component 1 and also four contacting agents 5 of the component 2 come into linear contact with the annularly constructed coupling element 3. As shown, the contacting agents for each component are arranged fixedly on the respective component to be distributed in each case by α=90° around the axis 4.

It is assumed that the component 1 comes into secure contact with the coupling element 3 by its coupling agents 6. By contrast, the component 2 can be rotated relatively to the component 1 around the axis 4, so that the spacing angle β, which is enclosed by the contact points of the contacting agents 5 with respect to the component 2 and those of the coupling agents 6 with respect to the component 1, can be varied in a range from 0°≤β≤360/2n=45° (where n=4).

The effective stiffness of the annular coupling element 3 relative to the axis 4 results from the flexibility of the annularly constructed coupling element 3 between the respective contact points of the contacting agents 5 and 6. By changing the angle β to change the angular position of the two components 1 and 2 with respect to one another, the axially effective stiffness of the annularly constructed coupling element 3 can be adjusted in an infinitely variable manner. Smaller angles β provide a higher stiffness and larger angles β provide a lower stiffness. Of course, it is possible to choose the number n of contacting agents to be provided for each component depending on the application.

Figure 3B:
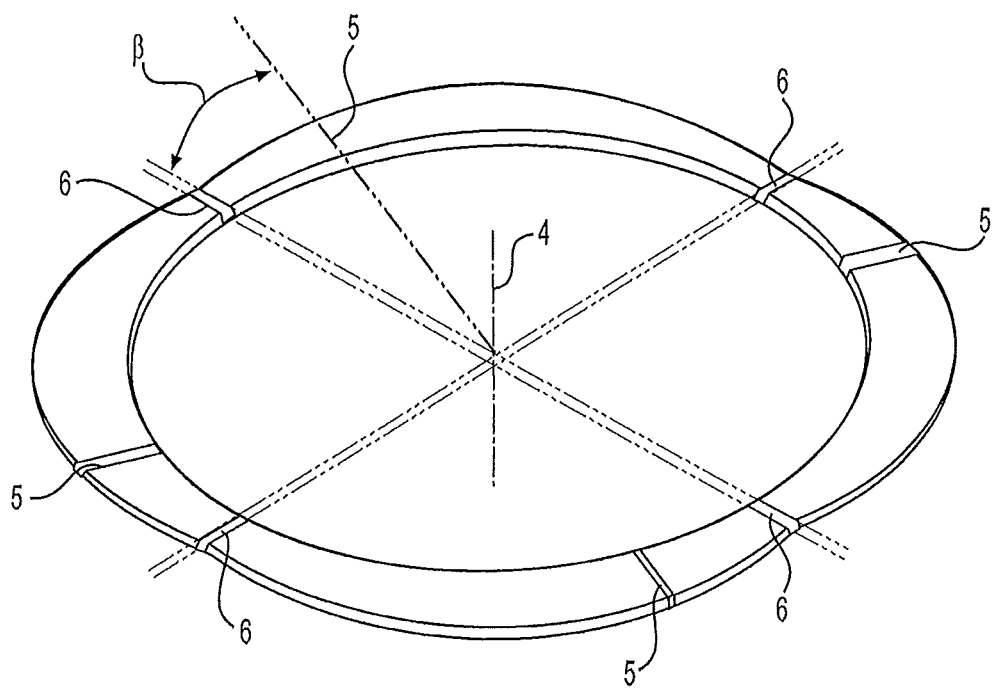
Figure 4:
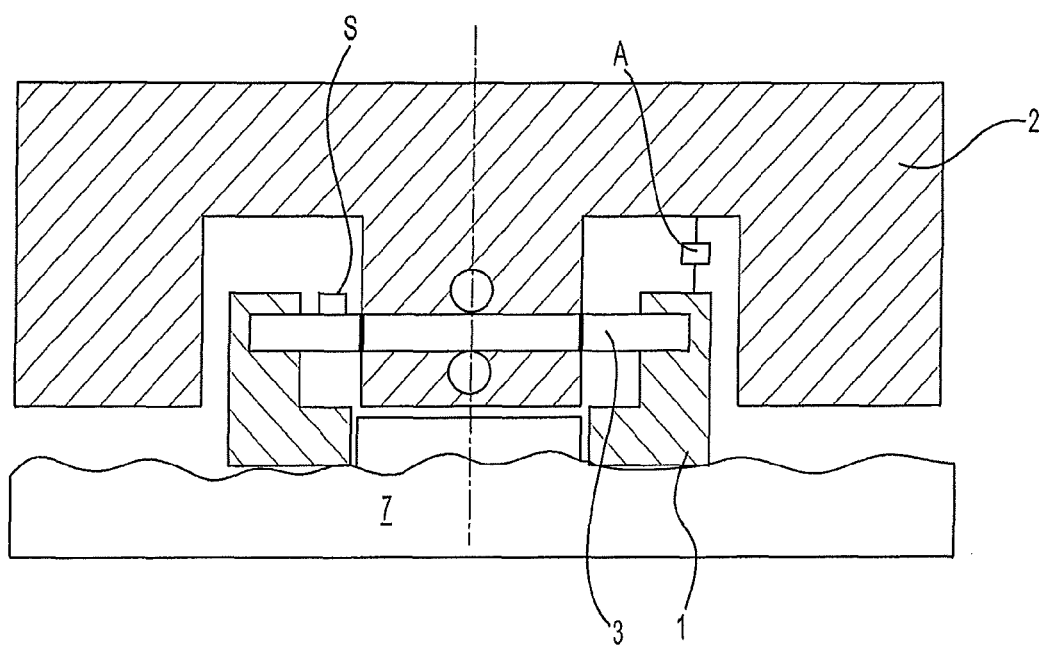

The construction of the coupling element 3 is not required to be circular. For example FIG. 3b shows a modified annular shape, in which the ring width between the contact points is dimensioned to be larger than the ring width at the contact points. Deviations from the annular shape, for example as n-cornered constructions are also fundamentally possible shapes of the coupling element.

In order to rotate the component 1 relatively to the component 2 around the axis 4 to vary the angular dimension β, the rotatable component 2 of FIG. 1 can be rotated manually around the spatial axis 4. It is also possible to provide an adjustment actuator between both components 1 and 2, in order to enable an adaptive, autonomous or remote controllable stiffness adjustment. An adjustment actuator of this type can advantageously be placed integratively into the inner space between both components 1 and 2. Particularly suitable as an adjustment actuator, for example, is an electrical motor constructed as a stepping motor with or without gearbox, a travelling wave motor driven by a piezoelectric material, an inchworm motor based on the use of a converter material, preferably on piezoelectric actuators. Further, the annularly constructed coupling element itself can be constructed as a travelling wave motor, in that the annular surfaces are provided with suitable planar piezoelectric actuators. The use of actuators based on shape memory alloys (SMAs) is also possible. Thus, the lengthening or shortening of wires produced from SMA material can be converted into a rotational movement of both components 1 and 2 relative to one another. In addition to the previously mentioned actuator principles, all actuators are suitable in which a translational movement can be translated into a rotational movement, such as for example the use of stack actuators based on piezoelectric converters or electroactive elastomers. The movement conversion can be enabled by mechanical or hydraulic transmissions.

A further influence on the axially effective stiffness or elasticity of the annularly constructed coupling element is the addition to the different positioning of the contact points of the contacting agents in the direction of the surface of the ring, as described previously, and in particular, choosing a material from which the annular coupling element 3 is constructed. Fundamentally, the annular coupling element is an elastic material, such as for example steel, or a fiber composite material. The construction of the annular coupling element from a combination of a plurality of different materials, for example in a sandwich structure is also possible. Thus, more strongly damped materials, such as elastomers can also be used. Also an additional damping, for example by use of piezoelectric converters applied on the annular coupling element or between a plurality of rings is possible. For additional damping, materials such as dielectric elastomers, ferroelectric films or magneto or electrostrictors are additionally possible. These can preferably be introduced in the inner space at least in certain areas between the first and the second components and connect both components to one another, in order in this manner to influence the vibration behavior of at least one component.

The material and the geometric shape of the annularly constructed coupling element fundamentally determines the amount of the resulting stiffness for any angle $\beta$. With different realizations of the geometric shape and the material, different stiffness characteristics can consequently be achieved by adjustment of angle $\beta$.

Figure 4:
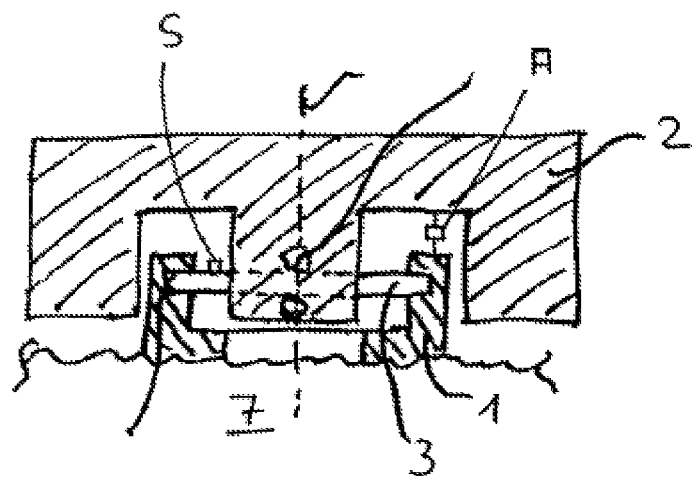
FIG. 4 shows an exemplary embodiment for a vibration absorber.

FIG. 4 shows an embodiment of the device according to the invention, which is a compactly configured vibration absorber. In this case, the first component 1 is securely or integrally connected to a body 7 to be vibration damped. The second component 2 which is connected via the coupling agent 3 to the first component 1, constitutes the absorber mass of the vibration absorber. This embodiment has an advantage to provide a vibration absorber system in a space limited compact manner, in which an inner space is encompassed by the components 1 and 2, in which the inner space of all of the elements necessary for adjusting the absorbing frequency is introduced. Thus, there is a requirement for example for vibration detection by a sensor S correspondingly attached on the annular coupling element 3 which for example may be a piezoelectric planar sensor. As a function of the respectively detected vibration state, the axially directed stiffness of the annularly constructed coupling element 3 is changed by a suitable adjustment actuator A, by the component 2, rotating the absorber mass relative to the component 1 around the axis 4.

It is particularly advantageous that the exterior shape of the vibration absorber does not change during the rotation of the two components 1 and 2 relative to one another. This differentiates the vibration absorber system according to the invention from systems which are known, in which for example masses are displaced in a translational manner.

Figure 5:
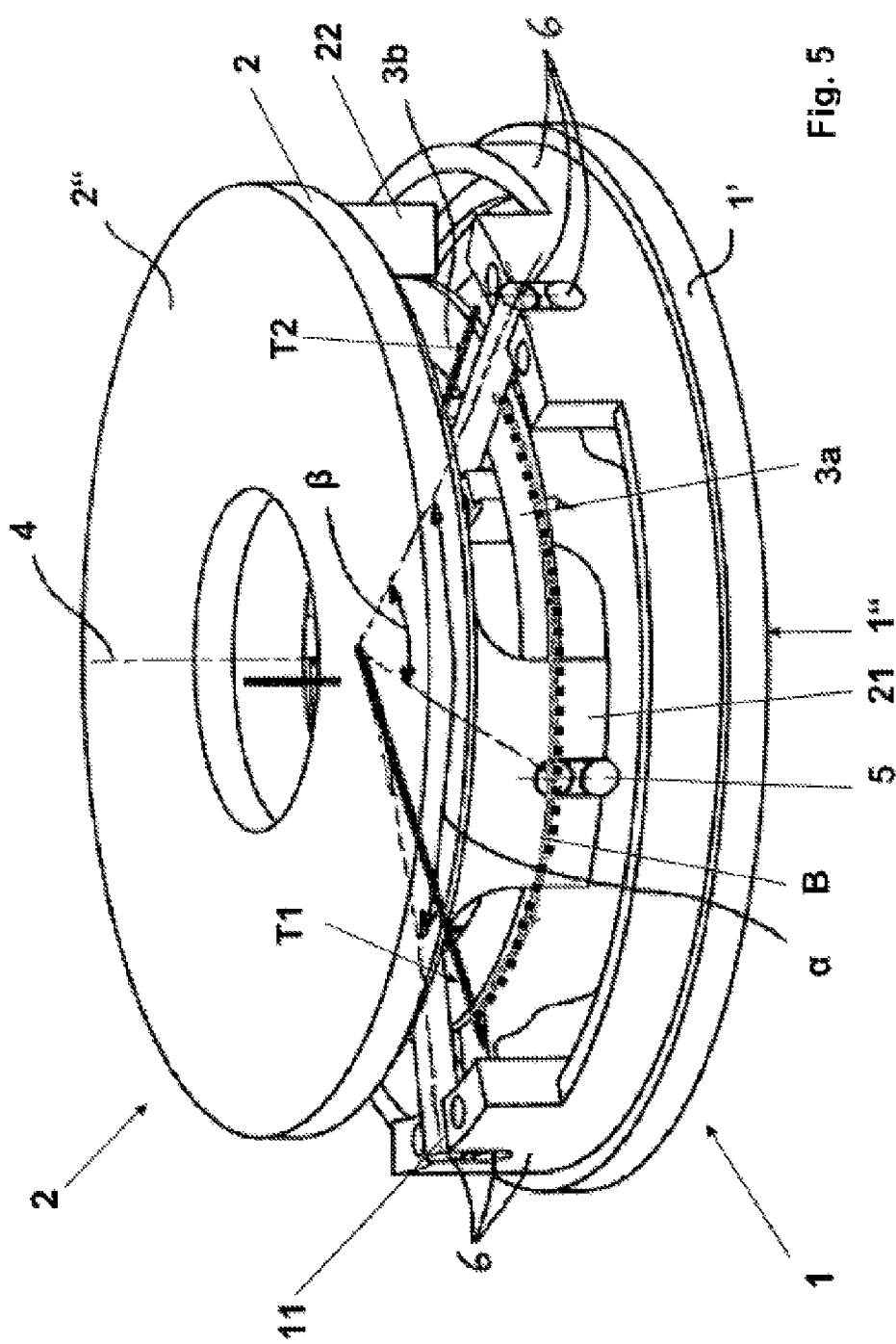
FIG. 5 shows an exemplary embodiment for transmitting or decoupling mechanical vibrations with divided planar element.

Shown in FIG. 5 is an embodiment which is comparable to the exemplary embodiment illustrated in FIG. 1. For this reason, the known reference numbers used in FIG. 5 refer to components which have already been explained. To avoid repetitions, the known components are not explained again. By contrast with FIG. 1, the annular coupling element 3 is not constructed as a disc constructed in one piece as in FIG. 1. Instead, the disc is then divided into four disc sectors 3a, 3b, 3c and 3d with the disc being separated by four times radial cross cuts T1, T2, T3 and T4 (T3, T4 not illustrated) to provide four equally sized disc sectors 3a, 3b, 3c and 3d with the sectors 3c and 3d not being visible due to the perspective illustration. To represent all four disc sectors, the following explanation of the disc sector 3a is representative of the others, which, has two end-face rectangular separation planes along the cross cuts T1 and T2. Of course, a geometry deviating from the disc shape can also be chosen as coupling element, such as for example a wire-shaped coupling element with a circular wire cross section, which is shaped to form a ring.

In order to support the individual disc sectors 3a, 3b, 3c and 3d, which are separated from one another, between both components 1 and 2 in the shape illustrated in FIG. 5, using the example of the disc sector 3a. Each disc is securely supported on one side directly to the cross cut T2 by the rod contacting agents 6, which are securely supported on the bottom component 1, for example by a clamping force connection. The opposite end-face separation plane of the disc sector 3a along the cross cut T1 ends in an exposed manner without further bearing points or planes. The end-face separation planes of the adjacent disc sectors loosely adjoin one another. Thus, the supporting of the ring sector 3a and also all remaining disc sectors corresponds to the support of a spring or bending beam which is clamped on one side. The arc length B, drawn as a dotted line in FIG. 5 corresponds to the arc length of the disc sector 3a clamped on one side, in the direction which the contacting agent 5 of the component 2, which is in sliding contact with the disc sector 3a, is rotatably supported. The contacting agents 5 encompass the disc sector on both sides, that is from above and from below and have the capacity in this manner to introduce bidirectional vibration forces onto the disc sector 3a.

For varying the stiffness acting between both components in the direction of the axis 4, both components 1 and 2, as also explained in the case of the exemplary embodiment in FIG. 1, are movable relative to one another. The softest setting results from the division of the coupling element into disc sectors, but only in the case of a rotation of the component 2 with respect to the component 1 at the separation point of the respective disc sectors and not as in the case of the half angle between the connection points of the exemplary embodiment in FIG. 1. Thus, the softest setting is reached, when the contacting agents 5 of the component 2, which can be seen in FIG. 5, are located along or close to the separation line T1. In this position in particular, the vibration forces act in each case on the regions of the disc sectors most remote from the respective secure support points.

Figure 6:
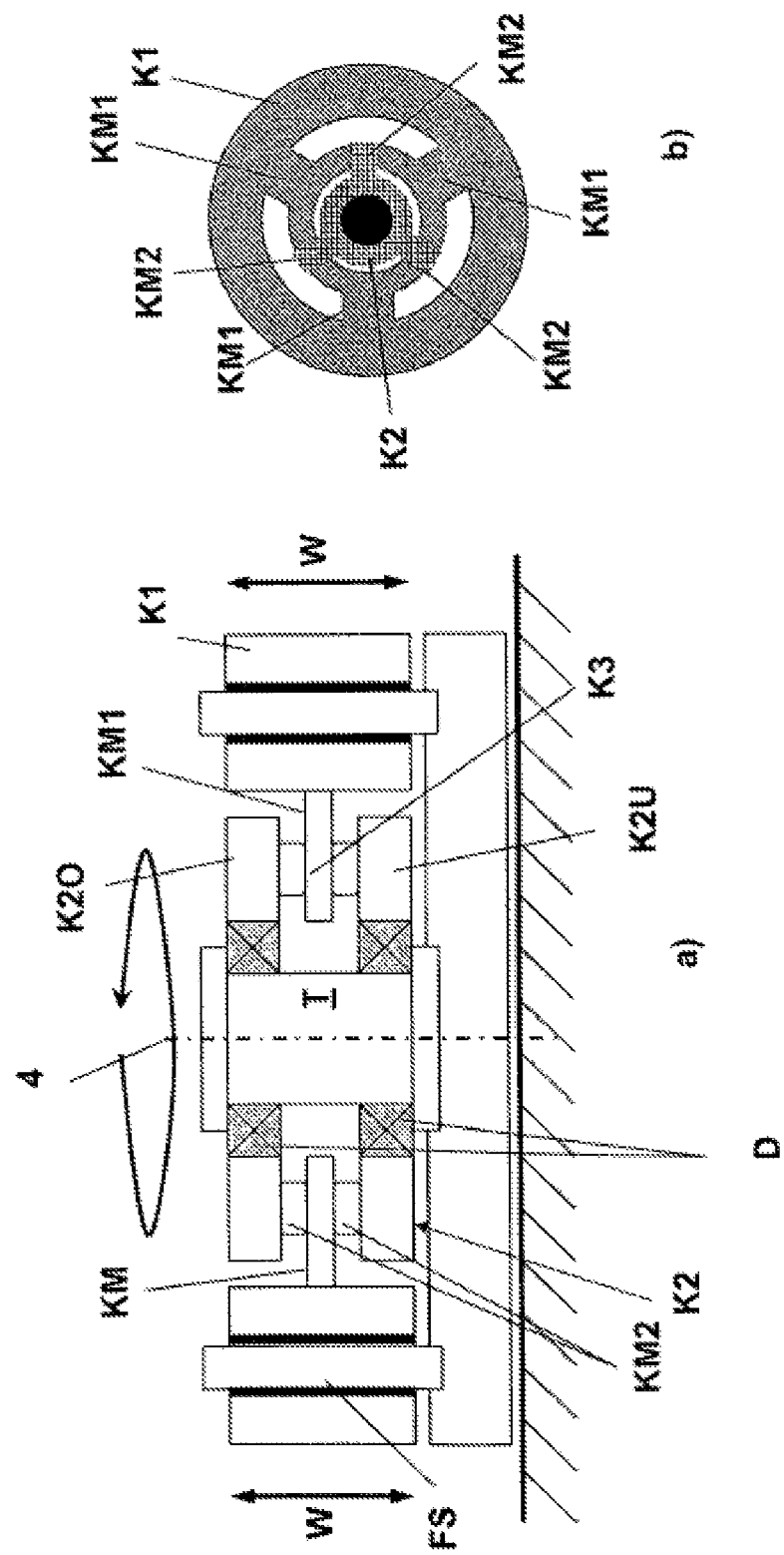
FIG. 6 shows an exemplary embodiment of a device for transmitting or decoupling mechanical vibrations between two components.

Illustrated in FIG. 6 is a further exemplary embodiment for a device for transmitting or decoupling mechanical vibrations between two components.

FIG. 6a shows a longitudinal section through an advantageously constructed device, with a first component K1, which is circular and is supported in a bidirectionally vibrating manner with respect to the direction of action W in accordance with the arrow illustrations. The first component K1 constitutes a circular mass, which can however also have other design geometries. A planar element K3 constructed as a disc is fixed by contacting agents KM1 constructed in a web-like manner on the inner circumference of the first circular component K1. In the exemplary embodiment illustrated, the contacting agents KM1 are a web integrally connecting the disc-shaped planar element K3 to the first component. The three web-like contacting agents KM1 provided in the exemplary embodiment are evenly distributed relatively to the inner circumferential ring of the annularly constructed first component K1. That is, they enclose an angle of 120° with one another with respect to the central axis, which is a rotational axis 4 at the same time. Of course, two, four or more contacting agents KM1 constructed as a web can also be provided for the connection between the planar element K3 and the first component K1. In all cases, the respective contacting agents KM1 constructed as a web are arranged in an evenly distributed manner around the circumference.

A second component K2 is arranged rotatably about the rotational axis 4 which is attached along a support structure T, which either static or fixed so that it can be displaced in an axially fixed manner relatively to the rotational axis 4. That is, it cannot be displaced in the direction of action W. The second component K2 is constructed as a double ring structure and has an upper disc shape K2O and also a lower disc shape K2U, which are both arranged above one another and flush with one another in the direction of the rotational axis 4 and are joined by a rotary bearing D which is axially fixed with respect to the support structure T. The disc shapes K2O and K2U of the second component K2 project radially beyond the planar element K3, which is a disc. The contacting agents KM2 are preferably constructed as sliding or rolling bodies. The second component K2 is in sliding or rolling contact with the planar top side and also is in contact with the planar bottom side of the planar element K3. Like the number of contacting agents KM1, a corresponding number of contacting agents KM2 is provided, which are evenly distributed and attached around the rotational axis 4. In the plan view illustration according to FIG. 6b, it can be seen that the contacting agents KM2 associated with the second component K2 are attached evenly distributed around the rotational axis 4.

The first component K1 is held or supported completely by the support of the planar element K3 between the contacting agents KM2. To insure an exclusively bidirectionally oriented longitudinal movement of the first component K1 in the direction of action W, the first component K1 is penetrated by guide pins FS which are connected to the support structure T.

If it is necessary to vary the spring stiffness between the first component K1 and the second component K2, it is only necessary to rotate the component K2 supported rotatably around the rotational axis 4 relative to the component K1 which is rotationally fixed about the rotational axis 4. The situation which can be seen from FIG. 6b corresponds to a relative position between the first and second components with minimum spring stiffness in each case which is maximum elasticity. The contacting agents KM1 associated with the first component K1 and the contacting agents KM2 associated with the second component K2 are at a maximum spaced from one another around the rotational axis. In the event of a congruent arrangement between the individual contacting agents KM1 and KM2, the position of maximum spring stiffness would be reached.

In the embodiment illustrated in FIG. 6, the first component K1 is supported in a rotationally fixed manner, whereas the second component K2 is arranged rotatably around the rotational axis 4. The first component K1 has the capacity only to execute bidirectional vibrations in the direction of action W, without being subject to a rotation. In contrast, the second component K2 rests relative to the direction of action W, but is supported rotatably around the rotational axis 4.

A further preferred property of the embodiment illustrated in FIG. 6 is the rotatability through 360° of the second component K2 relatively to the first component K1 and this is in any desired direction of rotation.

Furthermore, alternative embodiments of the embodiment illustrated in FIG. 6 are possible. Thus, it would be possible to connect the second component K2 in a rotationally fixed manner to the support structure T and to provide rotation between the contacting agents KM1 and the first component K1. This could for example be realized with a completely encompassing groove-shaped recess at the inner circumferential edge of the annularly constructed first component K1, into which recess the contacting web agents KM1, engage in each case.

The compact and outwardly closed shape of the device according to the invention, which can be seen in FIGS. 1 and 6, permits possible combinations of a plurality of structurally identical devices or devices equipped with different stiffness characteristics in accordance with the modular design principle. For example, two, three or more vibration decouplers illustrated in FIG. 1 or 5 can be coupled with one another by means of the compact shape. In this manner, the variably adjustable stiffness range can be enlarged considerably. For example, two of the vibration decouplers illustrated in FIG. 1 or 5 can be connected in series with the second coupling element of a first vibration decoupler being brought into mutual active connection with the first component of a second vibration decoupler. This can for example take place with the aid of a suitably constructed connecting element, which provides automatic adjustment of the spring stiffness of a vibration decoupler which begins as soon as the adjustment path for varying the spring stiffness in the other vibration decoupler has reached the end of the adjustment range. In terms of design, this can for example be realized by a corresponding driver mechanism.

Also, a corresponding series connection of a plurality of vibration absorbers constructed according to the invention enables a simultaneous damping of a plurality of frequencies in a system to be vibration damped.

In a further possible exemplary embodiment, the vibration decoupler constructed according to the invention can be used as an inertial mass exciter to provide a vibration excitation with piezoelectric converters applied on the annularly coupling element. Piezoelectric converters of this type can either be applied to the surface on the coupling element or integrated in the same. In the case of an annularly constructed coupling element produced from fiber composite material, an integration can be realized without substantial expense.

In an exemplary embodiment, it is also possible to provide planar piezoelectric converters integrated into or applied onto the annularly coupling element, for the purpose of an active or semi-active damping of the annular coupling element. A damping of this type of the coupling element is also possible in combination with or alternatively to the integrated or applied piezoelectric converters by damping elements which contain electrorheological or magnetorheological fluids and are connected in parallel to the annular coupling element. Damping elements of this type can be realized both as separate components, but also in particular can be integrated within the inner space encompassed by the two components 1 and 2.

An electrodynamic damping using an immersion coil connected in parallel to the annularly constructed coupling element constitutes a further alternative for a controlled damping of the annularly constructed coupling element.

Also, the vibration decoupler constructed according to the invention can be combined with a further sensor, for undertaking travel/speed or acceleration measurements. The sensor signals can be used as input variables for an actuator provided on the vibration decoupler.

In summary, the following advantages result in connection with the vibration decoupler constructed according to the invention, which can be used both as a support unit and as a vibration absorber:

The device according to the invention used for the targeted transmission or decoupling of mechanical vibrations enables an infinitely variable adjustment of the stiffness oriented in the direction of action of an annularly constructed coupling element over a much larger adjustment range compared to the known vibration decouplers.

The simple outlay for construction and the costs resulting from the production for the device according to the invention are very low.

Due to the compact outwardly visible shape, the actuator required for adjusting the angle of rotation and also, if appropriate, a sensor can be accommodated in a space-saving and mechanically protected manner in the interior between the two components. In the event of application as an absorber, a housing part can itself constitute the absorber mass.

In contrast with known vibration absorbers, the outwardly visible shape does not change during an absorbing frequency adjustment.

No actuator parts are required on the absorber mass, as a result of which it is possible to realize very small absorber masses, which in turn have a positive effect on the scalability with respect to forces and frequency range.

Very low damping can be achieved when using an annularly constructed coupling element produced from spring steel or a fiber composite material, as a result of which a strong absorbing action of the resonant frequency of the absorber can be induced.

By dynamically deforming the annularly constructed coupling element, energy can be generated of a piezoelectric converter applied on the coupling element, which energy can be used in further systems, to provide keyword energy harvesting.

The device according to the invention can very generally be used for vibration damping in technical systems or structures, thus in particular in the field of automotive technology, mechanical engineering and plant engineering. Both active and passive supporting of machines, mechanical engineering parts or assemblies can be realized. If it is necessary for example to support a machine semi-actively or with as little vibration as possible, then the support is held in a setting which is as hard as possible, that is, the axial effective stiffness of the coupling element is at maximum, when starting up the machine. By contrast, at the operating point, the support is brought into a soft setting by a switching which is as fast as possible, that is abrupt, in order to ensure a support which provides as much vibration damping as possible.

Also, the device according to the invention can be used in connection with service strength testing or component testing for connecting the components. As a result, stiffnesses present in the real environment of the components can be taken into account in the testing. Thus, an adjustable stiffness enables a very rapid adjustment of the respective connection conditions.

REFERENCE LIST

1 First component
1' First housing plate
1" First contact surface
11, 12 and 13 Accommodation structures
2 Second component
2' Second housing plate
2" Second contact surface
21, 22 and 23 Accommodation structures
3 Coupling element
4 Spatial axis, direction of action
5 Contacting agent
6 Contacting agent
7 Vibrating body
A1 Accommodation shoulder
Au Accommodation groove
S Sensor
A Adjustment actuator

The invention claimed is:

1. A device for transmitting or decoupling mechanical vibrations, comprising:
   a first component and a second component which are spaced apart and are rotatable about an axis of relative rotation of the first and second components and at least one of the first and the second components is free to vibrate in a direction parallel to the axis;
   a planar coupling element having a planar top surface and a planar bottom surface;
   at least two spaced apart first contacting agents which are attached to the first component and contact at least one of the top surface and the bottom surface of the planar coupling element; and
   at least two spaced apart second contacting agents which are attached to the second component and contact at least one of the top surface and the bottom surface of the planar coupling element; and wherein
   the vibrations of one of the first component and the second components which is free to vibrate acting in a direction parallel to the axis are adjusted by relative rotation of the first and second components about the axis.

2. The device according to claim 1, wherein:
   the planar coupling element is annual shaped or is a disc.

3. The device according to claim 2, wherein:
   the first contacting agents abut at least against the bottom planar surface to apply a force thereto; and
   the second contacting agents abut at least against the top planar surface to apply a force thereto.

4. The device according to claim 2, wherein:
   the first contacting agents either are releasably or unreleasably fixed to at least one of the bottom planar surface and the top planar surface; and
   the second contacting agents abut against at least one of the bottom planar surface and the top planar surface to apply a force thereto, or the second contacting agents are releasably fixed to at least one of the bottom planar surface and the top planar surface.

5. The device according to claim 2, wherein:
   the first and second contacting agents are rods or bars and contact the bottom planar surface and the top planar surface in a straight line; or
   the first and second contacting agents are strips and contact the bottom planar surface and the top planar surface; and
   the first and second contacting agents are disposed on the components and the first and second contacting agents extend radially from the axis.

6. The device according to claim 2, wherein:
   the contacting agents on each component are spaced equally around the axis so that an angle $\alpha$ is defined relative to the axis between adjacent components with $\alpha=360°/n$ with n being a number of contacting agents and $n \geq 2$.

7. The device according to claim 2, comprising:
   an adjustment actuator which rotates the components relative to one another around the axis.

8. The device according to claim 2, wherein:
the annular element or disc is divided into at least two separate, equally sized ring sectors or disc sectors, the ring sectors or the disc sectors each have two end-faces the end-faces of adjacent ring sectors or disc sectors face each other; and wherein
the first component is connected to at least two separated ring or disk sectors so that at least two separated sectors are joined to the first component at a contact point.

9. The device according to claim 3, wherein:
the first and second contacting agents are rods or bars and contact the bottom planar surface and the top planar surface in a straight line; or
the first and second contacting agents are strips and contact the bottom planar surface and the top planar surface; and
the first and second contacting agents are disposed on the components with the first and second contacting agents extending radially from the axis.

10. The device according to claim 3, comprising:
an adjustment actuator which rotates the components relative to one another around the axis.

11. The device according to claim 1, wherein:
the first contacting agents abut at least against the bottom planar surface to apply a force thereto; and
the second contacting agents abut at least against the top planar surface to apply a force thereto.

12. The device according to claim 11, wherein:
the first contacting agents are either releasably or unreleasably fixed to at least one of the bottom planar surface and the top planar surface; and
the second contacting agents abut against at least one of the bottom planar surface and the top planar surface to apply a force thereto, or the second contacting agents are releasably fixed to at least one of the bottom planar surface and the top planar surface.

13. The device according to claim 11, wherein:
the first and second contacting agents are rods or bars and contact the bottom planar surface and the top planar surface in a straight line; or
the first and second contacting agents are strips and contact the bottom planar surface and the top planar surface; and
the first and second contacting agents are disposed on the components with the first and second contacting agents extending radially from to the axis.

14. The device according to claim 11, wherein:
the contacting agents on each component are spaced equally around to the axis and form an angle $\alpha$ disposed relative to the axis between adjacent components with $\alpha=360°/n$ with n being a number of contacting agents and $n \geq 2$.

15. The device according to claim 12, wherein:
the contacting agents on each component are spaced equally around the axis and form an angle $\alpha$ disposed relative to the axis between adjacent components with $\alpha=360°/n$ with n being a number of contacting agents and $n \geq 2$.

16. The device according to claim 11, comprising:
an adjustment actuator which rotates the components relative to one another around the axis.

17. The device according to claim 1, wherein:
the first and second contacting agents are rods or bars and contact the bottom planar surface and the top planar surface in a straight line; or
the first and second contacting agents are strips and contact the bottom planar surface and the top planar surface; and
the first and second contacting agents are disposed on the components with the first and second contacting agents extending radially from the axis.

18. The device according to claim 17, wherein:
the contacting agents on each component are spaced equally around the axis and form an angle $\alpha$ disposed relative to the axis between adjacent components with $\alpha=360°/n$ with n being a number of contacting agents and $n \geq 2$.

19. The device according to claim 17, comprising:
an adjustment actuator which rotates the components relative to one another around the axis.

20. The device according to claim 1, wherein:
the first and the second contacting agents are spaced equally around the axis so that an angle $\alpha$ relative to the axis between adjacent first contact agents and between adjacent second contacting agents is defined as $\alpha=360°/n$ with $n \geq 2$, with n being a number of the first contacting agents and the number of the second contacting agents.

21. The device according to claim 20, wherein
the first and second components rotate around the axis from a first rotational position, in which the planar coupling element has a lowest stiffness parallel to the axis, the first contacting agents and the second contacting agents are spaced apart from each other by a mutual spacing angle $\beta$ defined as $\beta=360°/2n$ with n being a number of contacting agents, and project onto the planar coupling element, to a second rotational position, in which the planar coupling element has a highest stiffness and the first contacting agents and the second contacting agents project onto the planar coupling element to at least partially overlap each other.

22. The device according to claim 20, comprising:
an adjustment actuator which rotates the components relative to one another around the axis.

23. The device according to claim 1, comprising:
an adjustment actuator which rotates the components relative to one another around the axis.

24. The device according to claim 23, wherein:
the adjustment actuator comprises a piezoelectric converter material which is applied to the planar coupling element or integrated therein.

25. The device according to claim 1, wherein:
the planar coupling element comprises a uniform material or a composite material.

26. The device according to claim 1, wherein:
the components comprise a housing, including an inner space, containing the planar coupling element which actively connects the components through the first and second contacting agents; and
the first and second components face away from the inner space.

27. The device according to claim 26, wherein:
the inner space is filled with a material which connects the components and influences vibration of at least one of the components.

28. The device according to claim 27, wherein:
the material is a magneto material or an electrorheological converter material.

29. The device according to claim 1, wherein:
at least one of the first and second components is part of a vibrating system.

30. The device according to claim 1, wherein:
the planar coupling element has a central opening containing the axis.

31. The device according to claim 1, wherein the first component is coupled to a system having the vibrations to be damped and the second component provides an absorber mass which is rotated manually or by an actuator with respect to the first component for adjusting a frequency at which the vibrations are absorbed.

32. The device according to claim 1, wherein:
the planar coupling element is annual shaped or is a disc; and
the first component is resiliently mounted by a connection to the planar coupling element along a circumferential edge of the planar coupling element and has contact points evenly distributed along a circumference of the planar coupling element.

33. The device according to claim 1, comprising:
a number of contact points between the first component and the planar coupling element and a number of contact points between the second component and the planar coupling element are identical in number.

34. A device for transmitting or decoupling mechanical vibrations, comprising:
a first component and a second component which are spaced apart and are rotatable about an axis of relative rotation of the first and second components and at least one of the first and the second components is free to vibrate in a direction parallel to the axis;
a planar coupling element having a planar top surface and a planar bottom surface and being elastic in a direction parallel to the axis;
the first component is fixedly connected to the planar coupling element at at least two contact points;
at least two spaced apart contacting agents which are attached to the second component and contact at least one of the top surface and the bottom surface of the planar coupling element; and wherein
vibrations of one of the first component and the second component which is free to vibrate in a direction parallel to the axis are adjusted by relative rotation of the first and second components about the axis.

35. The device according to claim 34, wherein:
the planar coupling element is annual shaped or is a disc; and
the first component is resiliently mounted by a connection to the planar coupling element along a circumferential edge of the planar coupling element and has contact points evenly distributed along a circumference of the planar coupling element.

36. The device according to claim 34, comprising:
a number of contact points between the first component and the planar coupling element and a number of contact points between the second component and the planar coupling element are identical in number.

* * * * *